United States Patent
Baan et al.

(10) Patent No.: US 6,341,808 B1
(45) Date of Patent: Jan. 29, 2002

(54) FLEXIBLE SHEET HANDLING APPARATUS

(75) Inventors: Robert L. Baan, Wallkill; Richard J. Cassidy, Newburgh; John R. Lankard, Jr., Poughkeepsie; Gerald Henry Leino, Walden; Raymond H. Turcotte, Hopewell Junction; James Utter, Fishkill, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/607,137

(22) Filed: Jun. 29, 2000

(51) Int. Cl.⁷ .................................................. B25J 15/06
(52) U.S. Cl. ...................................................... 294/64.1
(58) Field of Search ................... 294/64.1, 65; 248/362, 248/363; 269/21; 271/90, 103; 414/627, 737, 752.1

(56) References Cited

U.S. PATENT DOCUMENTS

| | | | | |
|---|---|---|---|---|
| 2,637,589 A | * | 5/1953 | Schulz et al. ............... 294/64.1 |
| 2,730,370 A | * | 1/1956 | Brewster ............... 294/64.1 X |
| 3,076,561 A | * | 2/1963 | Rogers .................. 294/64.1 X |
| 3,240,525 A | * | 3/1966 | Wood ........................ 294/64.1 |
| 3,377,096 A | * | 4/1968 | Wood ........................ 294/64.1 |
| 3,758,144 A | * | 9/1973 | Dalglish .................... 294/64.1 |
| 4,185,814 A | * | 1/1980 | Buchmann et al. ..... 294/64.1 X |
| 4,703,966 A | | 11/1987 | Lewecke et al. |
| 5,013,075 A | * | 5/1991 | Littell ....................... 294/64.1 |
| 5,535,997 A | | 7/1996 | Croyle et al. |
| 5,685,513 A | | 11/1997 | Tsukushi |
| 5,971,454 A | * | 10/1999 | Baan et al. ................ 294/64.1 |

* cited by examiner

Primary Examiner—Johnny D. Cherry
(74) Attorney, Agent, or Firm—Ira D. Blecker

(57) ABSTRACT

Disclosed is a flexible sheet handling apparatus including a frame having a vacuum passage located around the periphery of the frame. There is also a porous, polymeric plug which covers the vacuum passage. When a vacuum is applied to the vacuum passage and the porous, polymeric plug, a flexible sheet in contact with the porous, polymeric plug is uniformly held only around the periphery of the flexible sheet by the applied vacuum.

8 Claims, 2 Drawing Sheets

FLEXIBLE SHEET HANDLING APPARATUS

BACKGROUND OF THE INVENTION

The present invention relates to the handling of articles and, more particularly, relates to the handling of thin, flexible sheets of material by a vacuum apparatus.

In various production scenarios, it is necessary to handle thin, flexible sheets of material. Some of these thin, flexible sheets of material may be somewhat delicate so that special handling is required to avoid damaging these thin, flexible sheets of materials.

One particular type of a thin, flexible sheet of material is a so-called greensheet. The greensheet comprises ceramic material in a binder material. There may also be metallization on the greensheet in the form of wiring lines and vias. The binder material of the greensheet allows it to be handled and gives the greensheet a rubbery feel. However, while the greensheet is in the unsintered, i.e., green state, it must be delicately handled to avoid damaging the greensheet. And, when there is metallization on the greensheet, the greensheet can only be handled along the periphery of the greensheet.

Present day methods of handling greensheets include various devices which have vacuum cups or vacuum grooves around the device that enable the device to handle the greensheet. However, these devices cause edge damage and embossing of the greensheet, both of which are undesirable. Additionally, because of the spacing between vacuum cups, uneven handling of the greensheet often results.

While the present invention is directed to the handling of greensheets, it should be understood that the principles of the present invention have applicability to the handling of thin, flexible sheets of material in general.

Various proposals have been made for handling articles, including flexible sheets of material.

Baan et al. U.S. Pat. No. 5,971,454, the disclosure of which is incorporated by reference herein, discloses an article handler for picking up ceramic substrates by means of a vacuum. There is a plurality of compartments each of which is covered by a porous filter. The article handler is capable of picking up a variety of sizes of ceramic substrates.

Tsukushi U.S. Pat. No. 5,685,513, the disclosure of which is incorporated by reference herein, discloses a vacuum suction attachment pad wherein a pad body on a suction tool is designed to attach firmly to a smooth surface and wherein a plurality of suction ports are attached to a plenum that is attached to a vacuum source.

Croyle et al. U.S. Pat. No. 5,535,997, the disclosure of which is incorporated by reference herein, discloses a fabric piece automatic feeder with suction cup picker where a suction tool pad has a plurality of vacuum sources and vacuum ports attach to fabric flat pieces to transport them.

Lewecke et al. U.S. Pat. No. 4,703,966, the disclosure of which is incorporated by reference herein, discloses a vacuum lifting arrangement wherein a lift pad has a plenum with an attached piping to a vacuum and a plurality of vacuum ports, and an elastic sealing element in the form of a foam mat provided with a plurality of suction apertures.

In view of the efforts of others in this field, it is a purpose of the present invention to handle thin flexible sheets of material without causing damage to them.

It is another purpose of the present invention to handle thin flexible sheets of material by an apparatus which is lightweight and relatively inexpensive.

These and other purposes of the invention will become more apparent after referring to the following description of the invention considered in conjunction with the accompanying drawings.

BRIEF SUMMARY OF THE INVENTION

The purposes of the invention have been achieved by providing a flexible sheet handling apparatus comprising:
a frame having a periphery;
at least one vacuum passage located around the periphery, the at least one vacuum passage having at least one outlet at the periphery;
at least one porous, polymeric plug covering the at least one outlet;
wherein when a vacuum is applied to the at least one vacuum passage, the at least one outlet and the at least one porous, polymeric plug, a flexible sheet in contact with the at least one porous, polymeric plug is uniformly held only around a periphery of the flexible sheet by the applied vacuum.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
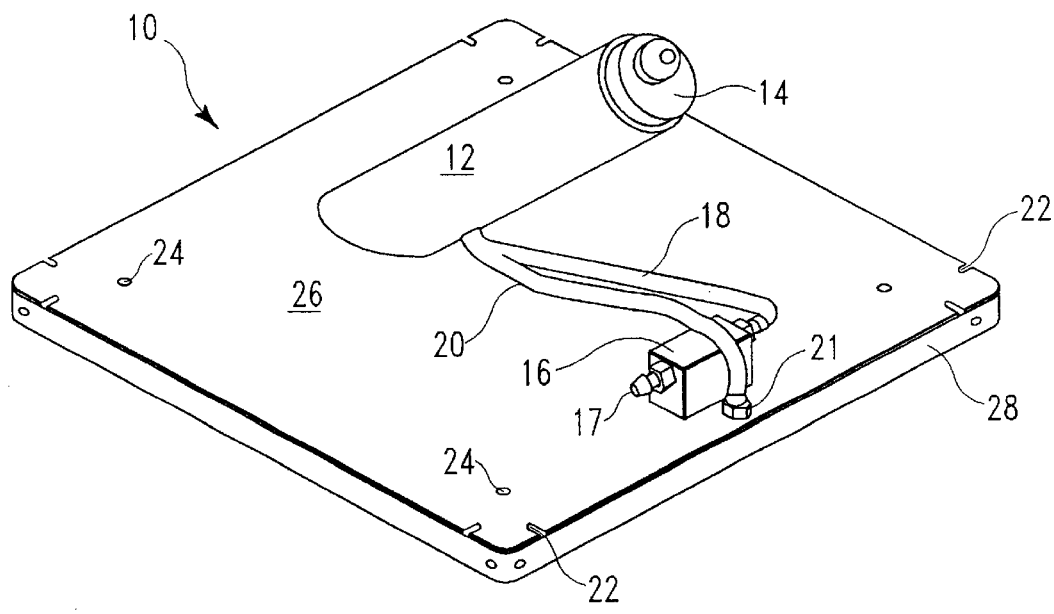
FIG. 1 is a perspective view of the flexible sheet handling apparatus according to the present invention.

Referring to the Figures in more detail, and particularly referring to FIG. 1, there is disclosed in more detail the flexible sheet handling apparatus 10 according to the present invention. The flexible sheet handling apparatus 10 includes a handle 12 for holding the flexible sheet handling apparatus 10. The handle 12 is attached to cover 26 by fasteners (not shown) while the cover 26 is attached to frame 28 by fasteners 22. Handle 12 is inclined with respect to the cover 26 for ease of gripping the flexible sheet handling apparatus 10. Also shown in cover 26 are airholes 24, the purpose of which will be discussed hereafter.

A vacuum source (not shown) would typically be connected to nipple 17 on coupling 16. Vacuum conduit 18 extends between coupling 16 and switch 14 in handle 12. Vacuum conduit 20 extends from switch 14 to nipple 21. Nipple 21 extends into the flexible sheet handling apparatus 10 to provide a vacuum source for the flexible sheet handling apparatus 10.

Figure 2:
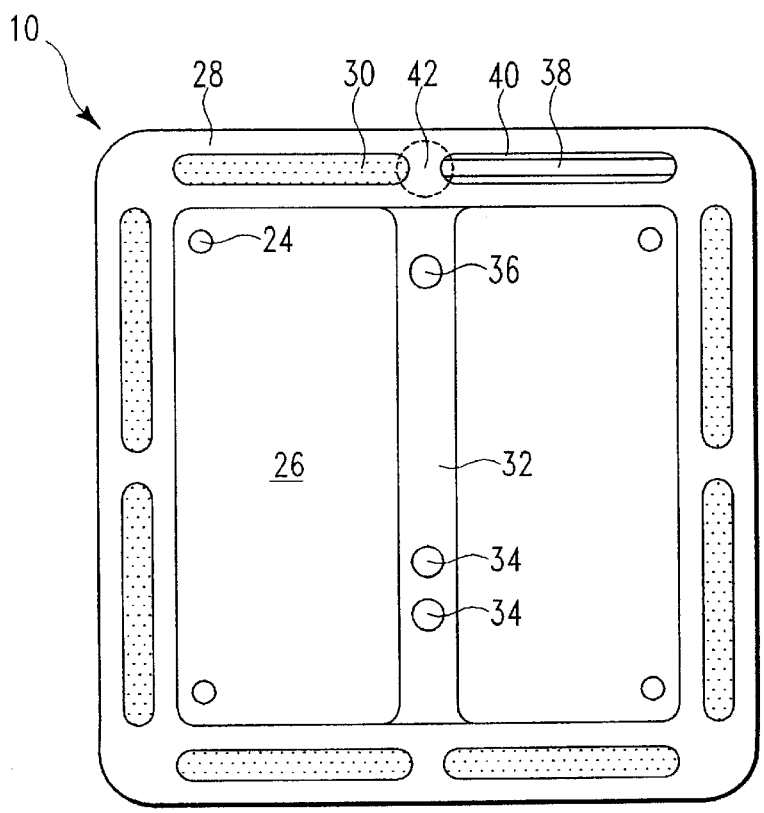
FIG. 2 is a bottom view of the flexible sheet handling apparatus according to the present invention.

Referring now to FIG. 2, the bottom of the flexible sheet handling apparatus 10 is shown. Frame 28 contains a vacuum passage 38 that extends around the periphery of the frame 28. Vacuum passage 38 communicates with nipple 21 through opening 42. Contained within vacuum passage 38 is a porous, polymeric plug 30. As shown in the Figures, there are a plurality of such porous, polymeric plugs 30, one of which has been removed in FIG. 2 so as to expose vacuum passage 38.

The porous, polymeric plug 30 may be any material that has fine, connected porosity. The present inventors have found that a sintered, pelletized polyethylene material (e.g., POREX®, available from Porex Technologies, Fairburn, Ga.) having a pore size of 45 to 75 microns works well for the purposes of the present invention. The porous, polymeric plug 30 is preferably force fitted into the vacuum passage 38. The vacuum passage 38 has stops 40 to prevent the porous, polymeric plug 30 from extending too far into the vacuum passage 38.

Also shown in FIG. 2 is cross piece 32 which has perforation 36 for receiving a fastener (not shown) for connecting the coupling 16 to the cover 26 and cross piece 32 and perforations 34 for receiving fasteners (not shown) for connecting the handle 12 to the cover 26 and cross piece 32. Cross piece 32 connects two opposite sides of the frame 28. The configuration of cross piece 32 as shown in FIG. 2 is for illustration purposes only. It should be understood that cross piece 32 can assume any configuration so long as it provides rigidity to the frame 28 and serves as a platform for the connection of handle 12 and coupling 16.

Figure 3:
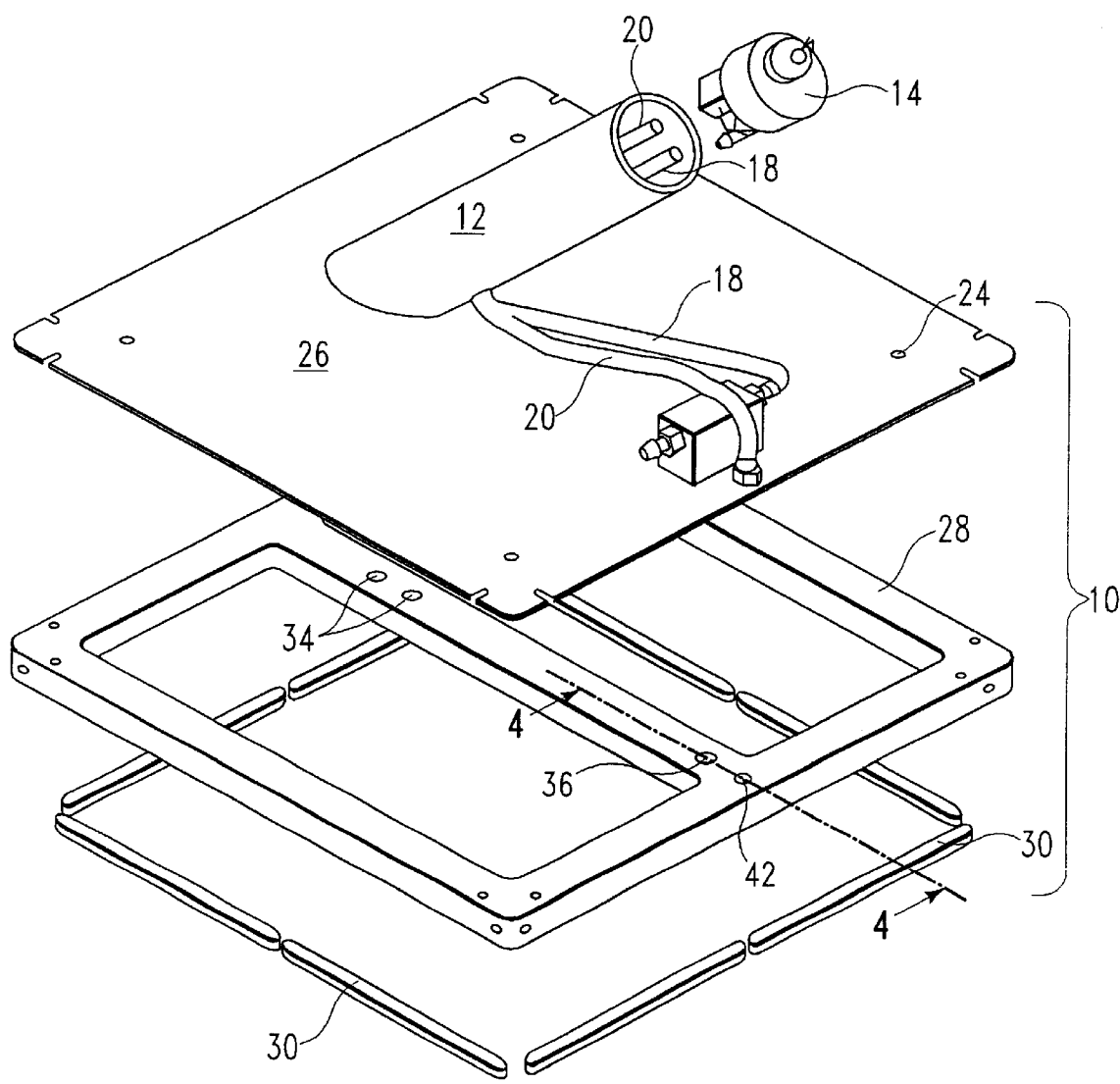
FIG. 3 is an exploded of the flexible sheet handling apparatus according to the present invention.

Referring now to FIG. 3, there is shown an exploded view of the flexible sheet handling apparatus 10, showing the handle 12, cover 26, frame 28 and porous, polymeric plugs 30. Switch 14 has been removed from the handle 12 to reveal vacuum conduits 18, 20. Opening 42 in frame 28 through which vacuum is applied to the flexible sheet handling apparatus 10 is shown more clearly in FIG. 3.

Figure 4:
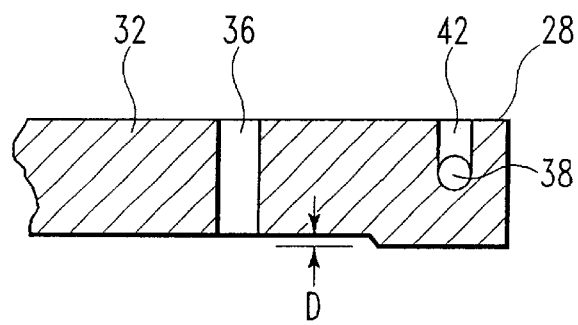
FIG. 4 is a partial cross sectional view of the frame of the flexible sheet handling apparatus in the direction of arrows IV—IV in FIG. 3.

FIG. 4 is a partial cross section through frame 28 in the direction of arrows IV—IV. As can be seen in FIG. 4, opening 42 connects with vacuum passage 38 in frame 28. As also can be seen in FIG. 4, cross piece 32 is recessed slightly by a dimension D with respect to the remainder of the frame 28. The purpose for this recess will be discussed shortly.

The operation of the flexible sheet handling apparatus 10 is as follows. The flexible sheet handling apparatus 10 is placed on a flexible sheet (e.g., a greensheet) that needs to be handled such as being picked up and moved to another location. Vacuum is applied through vacuum conduits 18, 20, opening 42, vacuum passage 38 and finally through porous, polymeric plugs 30 to hold the flexible sheet to the flexible sheet handling apparatus 10. Assuming vacuum is always on, the handle 12 is grasped and the flexible sheet handling apparatus 10 with the flexible sheet is moved to the new location. Switch 14 is pressed to break the vacuum, thereby releasing the flexible sheet from the flexible sheet handling apparatus 10. Airholes 24 allow air to bleed in between the cover 26 and the flexible sheet to more expeditiously release the flexible sheet from the flexible sheet handling apparatus 10.

Alternatively, if the vacuum is always off, switch 14 would be pressed to activate the vaccum. The flexible sheet handling apparatus 10 and the flexible sheet would be transported to the new location, at which point switch 14 would be released so as to break the vacuum.

The combination of the features of the invention including the location of porous, polymeric plugs 30 only at the periphery of the flexible sheet handling apparatus 10 allow flexible sheets to be handled without damaging them. Also, because the porous, polymeric plugs 30 extend almost around the entire periphery of the frame 28, and in fact can extend around the entire periphery of the frame 28 if desired, the vacuum that is applied to the flexible sheet is very uniform. That is, there are no substantial gaps where vacuum is absent or low.

The recess of the cross piece 32 with respect to the remainder of the frame 28 by a distance D as shown in FIG. 4 allows flexible sheets to be handled without disturbing the central portion of the flexible sheet. For example, in the case of metallized greensheets, there is metallization in the central part of the greensheet. This metallization cannot be touched as any touching will distort the pattern. Accordingly, cross piece 32 is recessed so as to avoid harming the metallization on the greensheet in any way.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A flexible sheet handling apparatus comprising:
   a frame having a periphery;
   at least one vacuum passage located around the periphery, the at least one vacuum passage having at least one outlet at the periphery;
   at least one porous, polymeric plug covering the at least one outlet;
   wherein when a vacuum is applied to the at least one vacuum passage, the at least one outlet and the at least one porous, polymeric plug, a flexible sheet in contact with the at least one porous, polymeric plug is uniformly held only around a periphery of the flexible sheet by the applied vacuum.

2. The flexible sheet handling apparatus of claim 1 wherein there are a plurality of outlets of the at least one vacuum passage at the periphery of the frame, the plurality of outlets being covered by the at least one porous, polymeric plug.

3. The flexible sheet handling of claim 2 wherein there are a plurality of porous, polymeric plugs covering the plurality of outlets.

4. The flexible sheet handling apparatus of claim 1 wherein the at least one porous polymeric plug is force fitted into the at least one outlet.

5. The flexible sheet handling apparatus of claim 1 wherein the frame further comprises a cross piece which is recessed with respect to the remainder of the frame.

6. The flexible sheet handling apparatus of claim 1 further comprising:
   a cover covering the frame;
   a handle attached to the cover, the handle having at least one vacuum conduit therein which communicates with the at least one vacuum passage; and
   a switch in the handle for controlling the vacuum in the at least one vacuum conduit and the at least one vacuum passage.

7. The flexible sheet handling apparatus of claim 6 wherein the handle is inclined with respect to the cover.

8. The flexible sheet handling apparatus of claim 1 wherein the at least one porous, polymeric plug comprises a sintered, pelletized, polyethylene material.

* * * * *